P. BONDARUK.
MOUSETRAP.
APPLICATION FILED SEPT. 10, 1921.
1,409,358.
Patented Mar. 14, 1922.
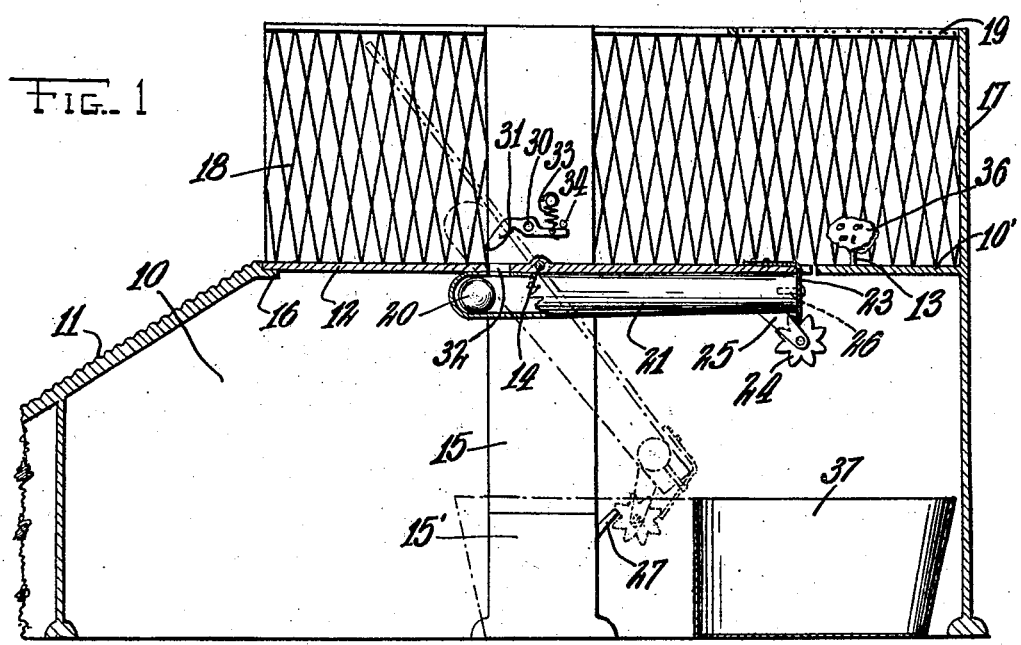
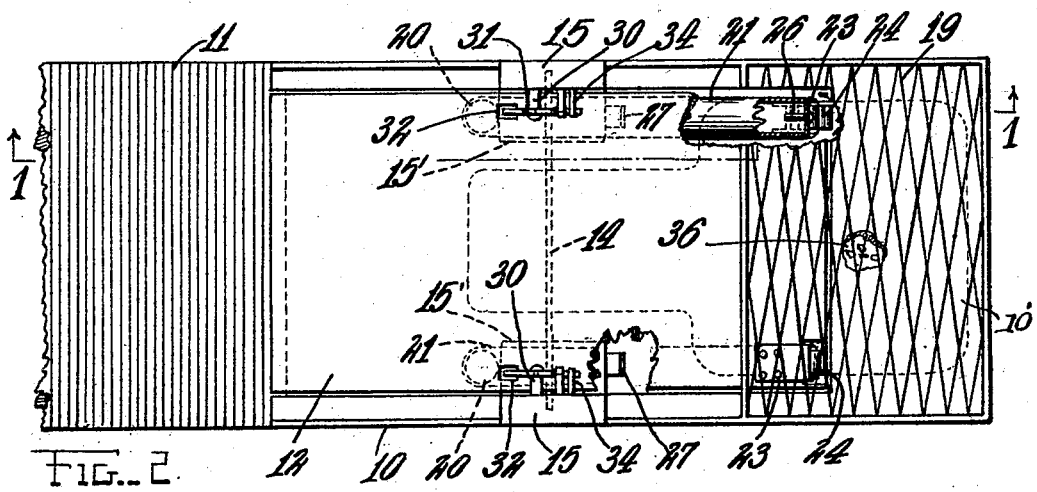
Inventor
Philip Bondaruk,
By
Attorney

UNITED STATES PATENT OFFICE.

PHILIP BONDARUK, OF MILFORD, MASSACHUSETTS.

MOUSETRAP.

1,409,358.  Specification of Letters Patent.  Patented Mar. 14, 1922.

Application filed September 10, 1921. Serial No. 499,801.

*To all whom it may concern:*

Be it known that I, PHILIP BONDARUK, citizen of Ukraina, residing at Milford, in the county of Worcester and State of Massachusetts, have invented certain new and useful Improvements in Mousetraps, of which the following is a specification.

This invention relates to animal traps, being intended more particularly for use in catching small animals such as mice or rats.

The invention has for an object to construct a trap having a pivoted trap door provided with means adapted to accelerate its opening movement, and which is automatically returned to closed position.

For further comprehension of the invention, and of the objects and advantages thereof reference will be had to the following description and accompanying drawings, and to the appended claims in which the various novel features of the invention are more particularly set forth.

Fig. 1 of the drawings is a longitudinal vertical sectional view of an animal trap constructed according to the invention, this view being taken along the line 1—1 of Fig. 2.

Fig. 2 is a plan view, with parts of the casing broken away.

As here shown my improved trap comprises a cage element which is in the form of a solid walled structure 10 which may be opened at the bottom and which is provided at one end with an inclined runway 11 leading to the top thereof.

The top of this cage 10 is constituted in the main by a trap door 12 which extends from the top of the runway 11 to a point a short distance from the opposite end of the trap, leaving a short fixed top element 10' on which is bait hook or spike 13. The door 12 is pivoted substantially midway between its ends as at 14 to and between a pair of side posts 15 which reinforce the cage 10 and extend above the latter. When in closed position the front end of the door 12 rests on a lip 16 formed at the top of the runway 11. An enclosure may extend around the sides and rear end of the top of the cage, this enclosure being here formed by a solid end piece 17 and wire mesh side pieces such as 18. A top piece 19 of wire mesh may also be placed over the bait hook 13.

The door 12 is yieldingly held in its closed position by means of a pair of ball weights 20 which are loosely held in tubes 21 fixed to the underside of the door and extending longitudinally thereof, the forward ends of these tubes being located a short distance in front of the pivot 14 of the door 12, the rear end of tubes 21 and door 12 being approximately flush. The lower sides of the tubes 21 are given a slight inclination upward from their front to rear ends so as to prevent the balls rolling toward the rear ends of the tubes while the door is closed.

Fixed to the rear end of the door 12 are flat springs 23 which extend downwardly across the rear ends of the tubes 21 and into engagement at their ends with star wheels 24 journaled in brackets such as 25 fixed to the tubes, the star wheels 24 being located in a position to have the springs 23 extend radially thereof. Fixed to the springs 23 and projecting longitudinally inward into the tubes 21, are studs such as 26.

The tubes 21 are located just to the inside of the posts 15 and the latter have lateral projections 15' at their lower ends on adjacent sides, from which fixed fingers 27 project upwardly and rearwardly in position to engage the teeth of the star wheels 24 when the door opens.

Suitably pivoted as at 30 to the posts 15 above the top of the cage 10 are detent pawls 31 which are adapted to project into the slots 32, extending through the door 12 and into the tubes 21, when the door opens fully, these pawls being pressed in the direction of the door by springs such as 33, movement of the pawls under the influence of the springs being limited by the stop pins 34. The pawls 31 are so constructed as to lift, against the action of springs 33, to allow the weights to pass to the rear ends of the tubes, but prevent return forward movement of such weights.

In the operation of the trap the animal walks up the runway 11 and onto the door 12 to reach the bait, indicated at 36. As the animal approaches the rear end of the door it overbalances the weights 20, causing the door to open and discharging the animal into the cage which may contain a receptacle 37 adapted to be filled with water into which the animal falls.

As soon as the door 12 is opened slightly the weights 20 start to roll toward the rear end thereof, accelerating the opening movement of the door when they pass the hinge point 14 of the latter. As the door swings down the starwheels 24 come into forcible contact with the fingers 27 and are given a partial turning movement, as will be apparent. This turning movement causes the springs 23 to be moved outward, or compressed, as indicated in dotted lines in Fig. 1, until the springs ride off the teeth of the starwheels 24, when the springs snap back, throwing the weights 20 up to the forward ends of the tubes 21, the pawls 31 riding over the weights 20 and then falling behind them. The weights 20 then cause the door to return to closed position, the pawls 31 holding the weights against rearward movement until the door is nearly closed, the door finishing its closing movement before the weights can move rearward to any appreciable degree.

Having thus described my invention what I claim as new and desire to protect by Letters Patent of the United States is as follows:

1. A trap comprising a cage, a trap door in the top thereof pivoted substantially midway between its ends, and a weight mounted on said trap door and normally resting on one side of the axis thereof and adapted to move across said axis upon a slight opening movement of the door, a tube carried by the door in which said weight is freely contained, a stud projecting into the rear end of said tube, a flat spring on which said stud is mounted, said spring normally urging said stud into said tube, and a device adapted for actuation by the momentum of the door as the latter opens to first retract and then release the said spring.

2. A trap comprising a cage, a trap door in the top thereof pivoted substantially midway between its ends, and a weight mounted on the said trap door and normally resting on one side of the axis thereof and adapted to move across said axis upon a slight opening movement of the door, a tube carried by the door in which said weight is freely contained, a stud projecting into the rear end of said tube, a flat spring on which said stud is mounted, said spring normally urging said stud into said tube, and a device adapted for actuation by the momentum of the door as the latter opens to first retract and then release the said spring, said means comprising a starwheel engaged by said spring, and a fixed finger adapted to be engaged by said starwheel.

3. A trap comprising a cage, a trap door in the top thereof pivoted substantially midway between its ends, and a weight mounted on one side of the axis thereof and adapted to move across said axis upon a slight opening movement of the door, a tube carried by the door in which said weight is freely contained, a stud projecting into the rear end of said tube, a flat spring on which said stud is mounted, said spring normally urging said stud into said tube, and a device adapted for actuation by the momentum of the door as the latter opens to first retract and then release the said spring, said means comprising a starwheel engaged by said spring, and a fixed finger adapted to be engaged by said starwheel, and a detent latch adapted to project into the said tube when the door is in open position to prevent movement of the weight toward the rear end of the tube.

4. A trap comprising a cage, a trap door in the top thereof pivoted substantially midway between its ends, and a weight mounted on said trap door and normally resting on one side of the axis thereof and adapted to move across said axis upon a slight opening movement of the door, a tube carried by the door in which said weight is freely contained, a stud projecting into the rear end of the said tube, a flat spring on which said stud is mounted, said spring normally urging said stud into said tube, and a device adapted for actuation by the momentum of the door as the latter opens to first retract and then release the said spring, said means comprising a starwheel engaged by said spring, and a fixed finger adapted to be engaged by said starwheel, and a detent latch adapted to project into the said tube when the door is in open position to prevent movement of the weight toward the rear end of the tube, said detent latch being free of said tube when the door is in closed position.

In testimony whereof I have affixed my signature.

PHILIP BONDARUK.